US009163720B2

(12) United States Patent
Eber

(10) Patent No.: US 9,163,720 B2
(45) Date of Patent: Oct. 20, 2015

(54) TRANSMISSION HYDRAULIC CONTROL SYSTEM HAVING AN AUTOMATIC ENGINE STOP-START ACCUMULATOR

(71) Applicant: GM Global Technology Operations LLC, Detroit, MI (US)

(72) Inventor: Kelly E. Eber, Oxford, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 136 days.

(21) Appl. No.: 13/669,931

(22) Filed: Nov. 6, 2012

(65) Prior Publication Data

US 2013/0118854 A1    May 16, 2013

Related U.S. Application Data

(60) Provisional application No. 61/559,467, filed on Nov. 14, 2011.

(51) Int. Cl.
    *F16H 61/00* (2006.01)
    *F16H 61/02* (2006.01)
    *F16D 48/02* (2006.01)
    *F16D 48/06* (2006.01)

(52) U.S. Cl.
    CPC ........ *F16H 61/0021* (2013.01); *F16H 61/0206* (2013.01); *F16D 48/066* (2013.01); *F16D 2048/0203* (2013.01); *F16H 2061/0034* (2013.01)

(58) Field of Classification Search
    None
    See application file for complete search history.

(56) References Cited

U.S. PATENT DOCUMENTS

| | | | | |
|---|---|---|---|---|
| 6,146,311 | A * | 11/2000 | Moorman | 477/150 |
| 7,445,100 | B2 * | 11/2008 | Ronk et al. | 192/3.58 |
| 8,282,532 | B2 * | 10/2012 | Shirasaka et al. | 477/152 |
| 8,382,626 | B2 * | 2/2013 | Moorman et al. | 475/129 |
| 8,734,293 | B1 * | 5/2014 | Perkarsky et al. | 477/115 |
| 8,739,953 | B2 * | 6/2014 | Gassmann et al. | 192/85.63 |
| 2010/0167872 | A1 | 7/2010 | Shirasaka et al. | |
| 2010/0236231 | A1 * | 9/2010 | Miyabe et al. | 60/413 |
| 2011/0118081 | A1 * | 5/2011 | Moorman et al. | 477/61 |
| 2011/0198178 | A1 * | 8/2011 | Lundberg et al. | 192/3.57 |
| 2012/0088631 | A1 * | 4/2012 | Zhang et al. | 477/52 |

FOREIGN PATENT DOCUMENTS

CN    102062207 A    5/2011

* cited by examiner

*Primary Examiner* — Ramya Burgess
*Assistant Examiner* — Mark Manley

(57) ABSTRACT

A hydraulic control system is provided for controlling the actuation of a plurality of torque transmitting mechanisms. The hydraulic control system includes an accumulator having parallel feed paths to the plurality of torque transmitting mechanisms.

17 Claims, 4 Drawing Sheets

TRANSMISSION HYDRAULIC CONTROL SYSTEM HAVING AN AUTOMATIC ENGINE STOP-START ACCUMULATOR

CROSS-REFERENCE

This application claims the benefit of U.S. Provisional Application No. 61/559,467 filed on Nov. 14, 2011. The disclosure of the above application is incorporated herein by reference.

FIELD

The present disclosure relates to a hydraulic control system having an automatic engine stop-start accumulator, and more particularly to an automatic engine stop-start accumulator with parallel torque transmitting device feed lines.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle.

One solution is to provide a stop-start accumulator to fill selected clutches during engine restart. However, there is a constant desire to increase the performance of stop-start accumulators, measured as the time required for the accumulator to fill the hydraulic circuit during a stop/start event and the initial charge pressure of the accumulator, where faster fill times and lower initial charge pressures provide improved performance.

SUMMARY

A hydraulic control system is provided for controlling the actuation of a plurality of torque transmitting mechanisms. The hydraulic control system includes an accumulator having parallel feed paths to the plurality of torque transmitting mechanisms.

In one example the hydraulic control system includes a source of pressurized hydraulic fluid, an accumulator subsystem in downstream fluid communication with the source of pressurized hydraulic fluid, a clutch solenoid in downstream fluid communication with the accumulator subsystem and the source of pressurized hydraulic fluid, a clutch actuator in downstream fluid communication with the clutch solenoid and the accumulator subsystem, a first fluid flow path from the source of pressurized hydraulic fluid through the clutch solenoid to the clutch actuator, and a second fluid flow path from the accumulator subsystem to the clutch actuator.

In another example of the present invention the accumulator subsystem includes an accumulator in communication with a first one-way valve and an accumulator solenoid, wherein the first one-way valve and the accumulator solenoid are disposed in parallel to one another.

In another example of the present invention the system includes a third fluid flow path from the source of pressurized hydraulic fluid through the first one-way valve to the accumulator and a fourth fluid flow path from the accumulator through the accumulator solenoid to the second fluid flow path.

In another example of the present invention the system includes a second one-way valve and a fifth fluid flow path from the second fluid flow path through the second one-way valve to the first fluid flow path.

In another example of the present invention the system includes a second clutch solenoid, a second clutch actuator, and a sixth fluid flow path from the first fluid flow path, through the second clutch solenoid, to the second clutch actuator.

In another example of the present invention the clutch actuator is configured to engage a first gear ratio in the transmission.

In another example of the present invention the clutch solenoid is a variable flow solenoid.

In another example of the present invention the second fluid flow path is disposed in parallel to the first fluid flow path.

In another example of the present invention the source of pressurized hydraulic fluid includes an engine driven pump.

In another example of the present invention the accumulator subsystem provides pressurized hydraulic fluid through the second fluid flow path when the engine driven pump is not being driven by the engine.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
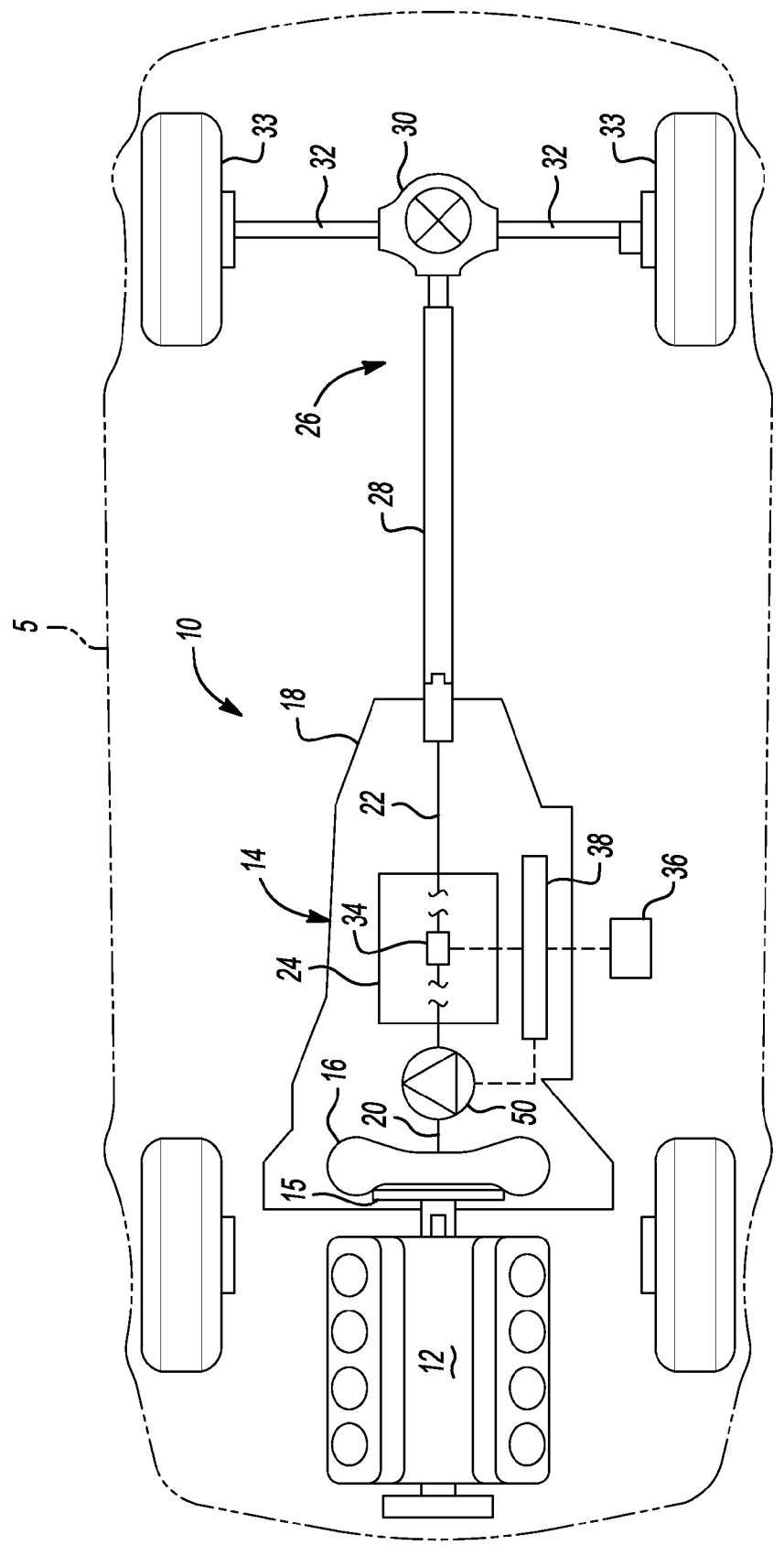
FIG. 1 is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control system 36. The control system 36 may include a transmission control module, an engine control module, or a hybrid control module, or any other type of controller. The control system 36 may include one or more an electronic control devices having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34.

Figure 2A:
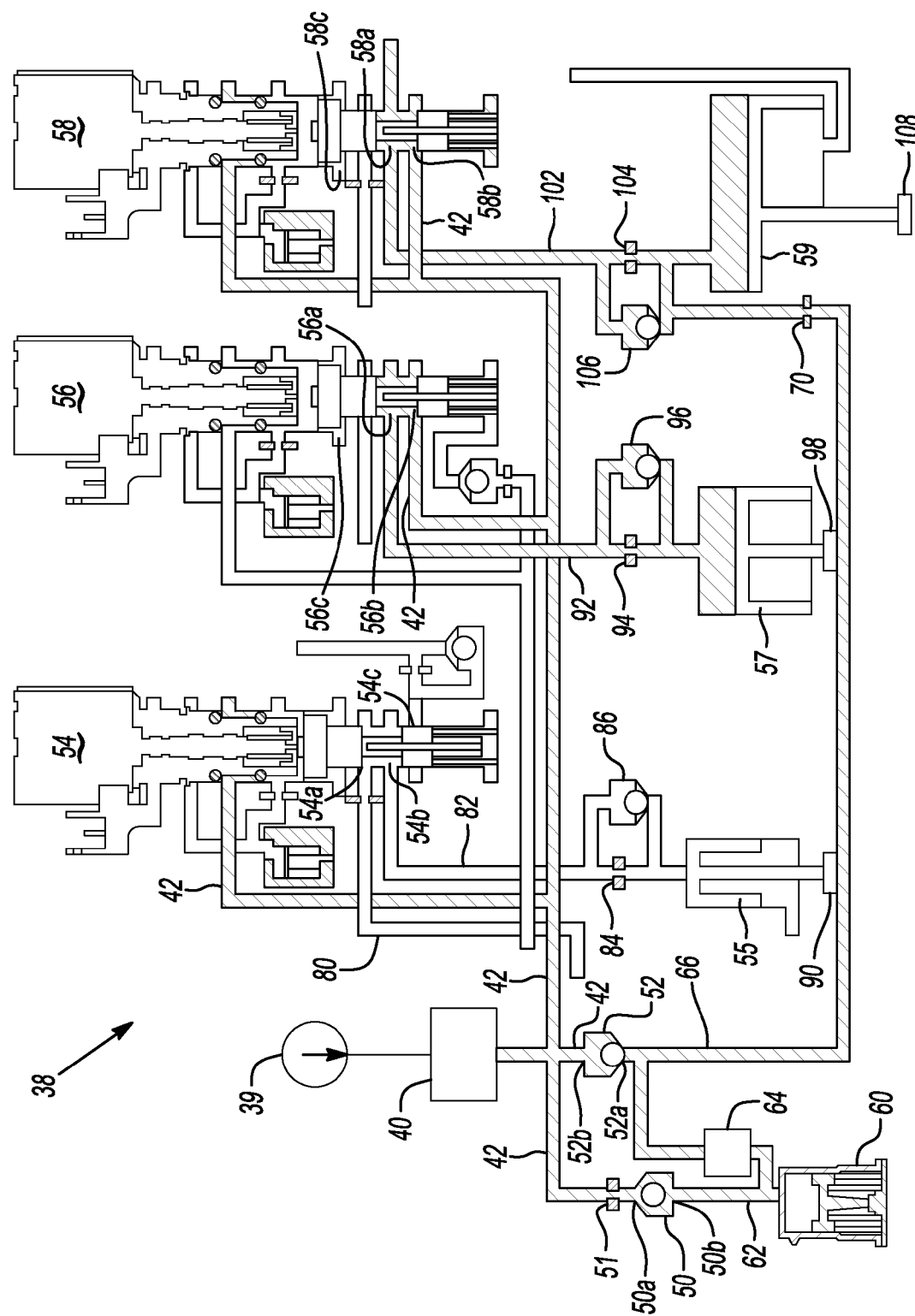
FIG. 2A is a schematic diagram of a portion of an exemplary hydraulic control system in a first operating condition.
Figure 2B:
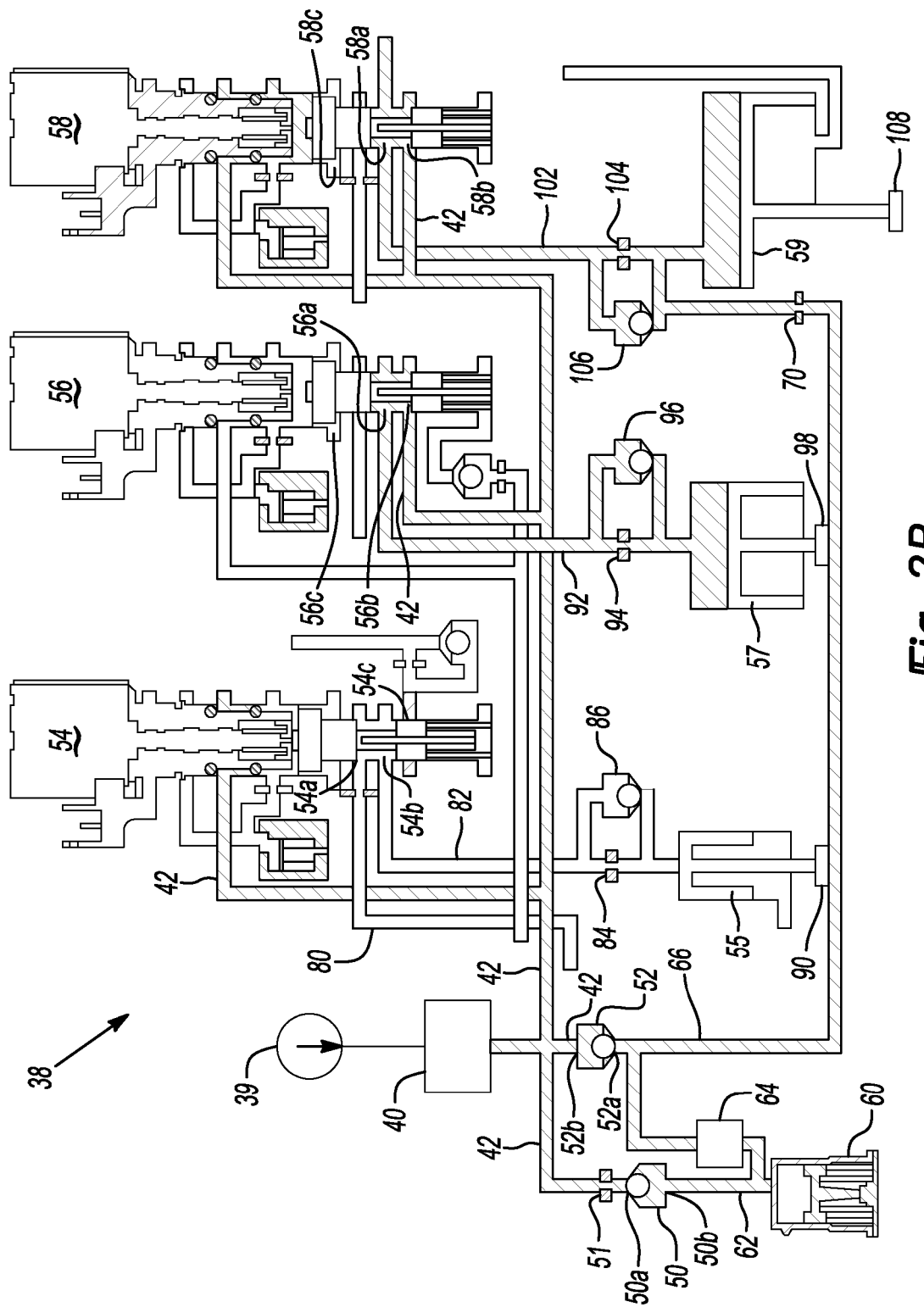
FIG. 2B is a schematic diagram of a portion of an exemplary hydraulic control system in a second operating condition.
Figure 2C:
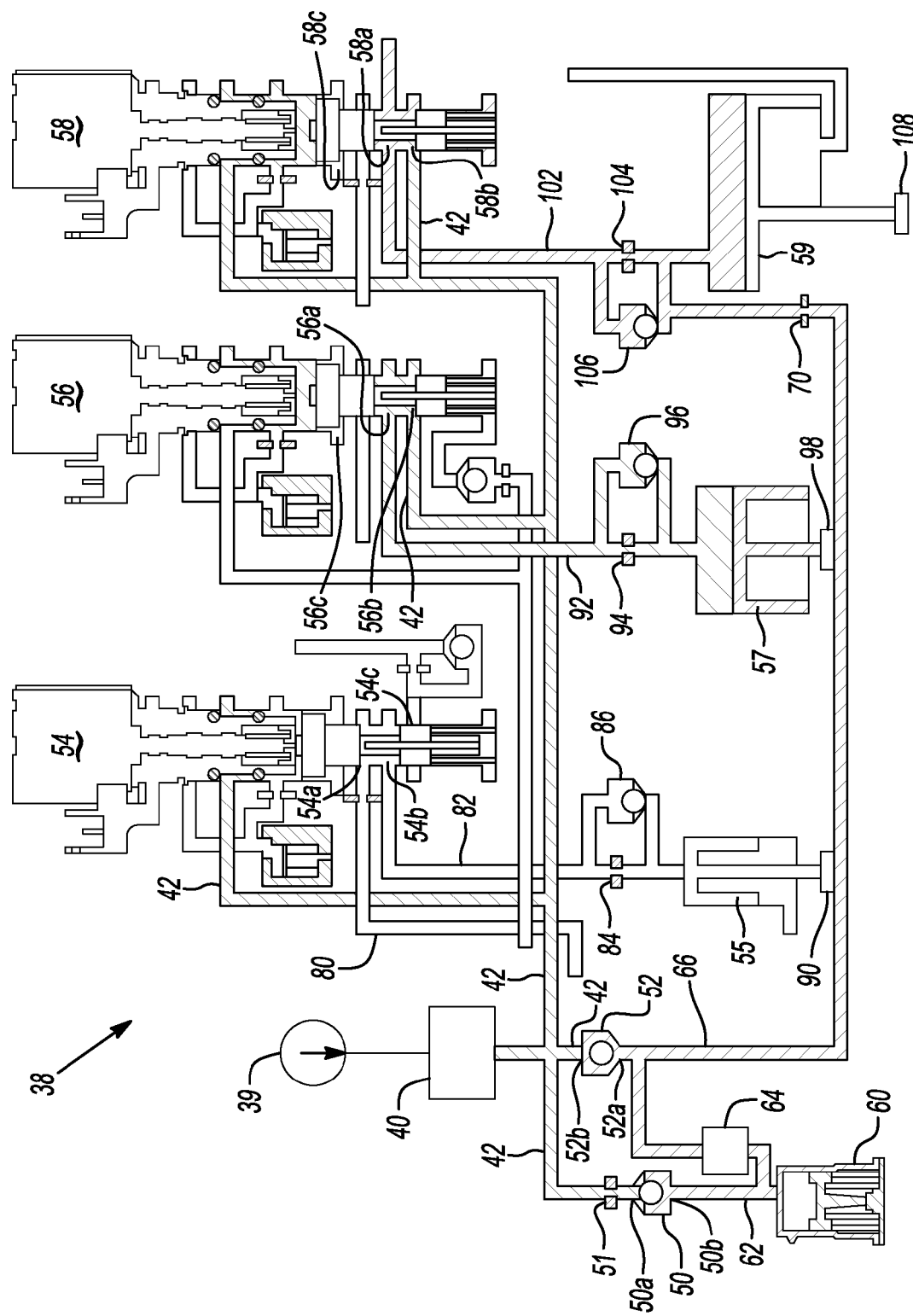
FIG. 2C is a schematic diagram of a portion of an exemplary hydraulic control system in a third operating condition.

Turning to FIGS. 2A-C, a portion of the hydraulic control system 38 is illustrated. The hydraulic control system 38 generally includes a source of pressurized hydraulic fluid, such as an engine driven pump 39. The pump 39 may be, for example, a gear pump, a vane pump, a gerotor pump, or any other positive displacement pump. The hydraulic fluid is communicated under pressure from the engine driven pump 39 to a line pressure control subsystem 40. The line pressure control subsystem 40 may include pressure regulator valves, solenoids, and other components operable to control the pressure of the hydraulic fluid provided by the pump 39. The line pressure control subsystem 40 provides pressurized hydraulic fluid to a main supply line 42.

The main supply line 42 is in communication with a first valve 50 via a fluid restriction orifice 51, a second valve 52, a first solenoid 54, a second solenoid 56, and a third solenoid 58. Each of the solenoids communicates with clutch actuators 55, 57, and 59, respectively. The first valve 50 is a one way check ball or poppet valve having a first fluid port 50A and a second fluid port 50B. The first fluid port 50A communicates with the main supply line 42 while the second fluid port 50B communicates with an accumulator 60 via an accumulator supply line 62. The first valve 50 is configured to maintain pressure in the accumulator 60 during normal operating conditions while the line pressure is lower than the accumulator pressure. In addition, the first valve 50 selectively prevents fluid flow from port 50B through port 50A to avoid fluid backfill through the orifice 51 during discharge of the accumulator 60.

The accumulator 60 is an energy storage device in which the non-compressible hydraulic fluid is held under pressure by an external source. The accumulator 60 includes a piston that has a seal that slides along a bore of the accumulator housing. On one side of the piston there is hydraulic fluid and on the other side of the piston there is a reaction element such as one or more springs and/or gas. The accumulator 60 uses the reaction element to generate the force on one side of the piston that reacts against the hydraulic fluid pressure on the opposite side of the piston. An example of an accumulator for use with the present invention is disclosed in commonly assigned U.S. patent application Ser. No. 12/635,587 filed Dec. 10, 2009, hereby incorporated by reference as if fully disclosed herein. The accumulator 60, when charged, effectively replaces the pump 39 as the source of pressurized hydraulic fluid, thereby eliminating the need for the pump 39 to run continuously.

The accumulator supply line 62 communicates with an accumulator control solenoid 64. The solenoid 64 is in fluid communication with clutch supply line 66. The solenoid 64 is electrically controlled by the control module 36 and is operable to control the charge state of the accumulator 60. The solenoid 64 is preferably an on/off solenoid that selectively allows communication between the accumulator 60 and the clutch supply line 66.

The clutch supply line 66 is in communication with the second valve 52 and the clutch actuator 59 via a flow restricting orifice 70. The second valve 52 is a one way check ball or poppet valve having a first fluid port 52A and a second fluid port 52B. The first fluid port 52A communicates with the clutch supply line 66 while the second fluid port 52B communicates with the main supply line 42. The second valve 52 is configured to selectively prevent fluid flow from port 52B through port 52A to avoid fluid flow into the clutch supply line 66 when the pump 39 is operating.

As noted above, each of the solenoids 54, 56, and 58 selectively feed the clutch actuators 55, 57, and 59, respectively. For example, the solenoid 54 includes an inlet port 54A that communicates with an outlet port 54B when the solenoid 54 is energized to a current greater than a null point current (i.e., the zero forward/reverse flow point for the given current) and includes an exhaust port 54C that communicates with the outlet port 54B when the solenoid 54 is de-energized to a current less than the null point current. Variable activation of the solenoid 54 regulates or controls the flow of the hydraulic fluid as the hydraulic fluid communicates from the inlet port 54A to the outlet port 54B. The inlet port 54A is in communication with a supply line 80 that in turn is in communication with the line pressure control subsystem 40. The outlet port 54B is in communication with a first clutch supply line 82. The exhaust port 54C is in communication with a sump or an exhaust backfill circuit (not shown).

The first clutch supply line 82 communicates with the clutch actuator 55 via a flow restriction orifice 84 and a bypass valve 86 disposed in parallel with the flow restriction orifice 84. The bypass valve 86 opens if pressure downstream of the flow restriction orifice 84 is greater than the pressure upstream of the flow restriction orifice 84, thereby allowing the clutch actuator 55 to empty quickly. The clutch actuator 55 may be a piston assembly that translates under hydraulic pressure to engage a first torque transmitting device 90.

The solenoid 56 includes an inlet port 56A that communicates with an outlet port 56B when the solenoid 56 is energized to a current greater than a null point current (i.e., the zero forward/reverse flow point for the given current) and includes an exhaust port 56C that communicates with the outlet port 56B when the solenoid 56 is de-energized to a current less than the null point current. Variable activation of the solenoid 56 regulates or controls the flow of the hydraulic fluid as the hydraulic fluid communicates from the inlet port 56A to the outlet port 56B. The inlet port 56A is in communication with the main supply line 42. The outlet port 56B is in communication with a second clutch supply line 92. The exhaust port 56C is in communication with a sump or an exhaust backfill circuit (not shown).

The second clutch supply line 92 communicates with the clutch actuator 57 via a flow restriction orifice 94 and a bypass valve 96 disposed in parallel with the flow restriction orifice 94. The bypass valve 96 opens if pressure downstream of the flow restriction orifice 94 is greater than the pressure upstream of the flow restriction orifice 94, thereby allowing the clutch actuator 57 to empty quickly. The clutch actuator 57 may be a piston assembly that translates under hydraulic pressure to engage a second torque transmitting device 98.

The solenoid 58 includes an inlet port 58A that communicates with an outlet port 58B when the solenoid 58 is energized to a current greater than a null point current (i.e., the zero forward/reverse flow point for the given current) and includes an exhaust port 58C that communicates with the outlet port 58B when the solenoid 58 is de-energized to a current less than the null point current. Variable activation of the solenoid 58 regulates or controls the flow of the hydraulic fluid as the hydraulic fluid communicates from the inlet port 58A to the outlet port 58B. The inlet port 58A is in communication with the main supply line 42. The outlet port 58B is in communication with a third clutch supply line 102. The exhaust port 58C is in communication with a sump or an exhaust backfill circuit (not shown).

The third clutch supply line 102 communicates with the clutch actuator 59 via a flow restriction orifice 104 and a bypass valve 106 disposed in parallel with the flow restriction orifice 104. The bypass valve 106 opens if pressure downstream of the flow restriction orifice 104 is greater than the pressure upstream of the flow restriction orifice 104, thereby allowing the clutch actuator 59 to empty quickly. The clutch actuator 59 may be a piston assembly that translates under hydraulic pressure to engage a third torque transmitting device 108.

The flow in out of the accumulator 60 is controlled by the first valve 50 and the solenoid 64. When the pump 39 is on, hydraulic fluid flows from the main line pressure subsystem 40 into the main supply line 42. From the main supply line 42, hydraulic fluid communicates into the solenoids 54, 56, and 58 and is available for actuation of the plurality of torque transmitting mechanisms 34. Additionally, once the hydraulic fluid passes through the orifice 51, the hydraulic fluid unseats the check valve 50 and flows into the accumulator 60. Therefore, in order to charge the accumulator 60, the pressure in the main supply line 42 must be higher than the pressure in the accumulator 60 in order to unseat the check valve 50 and the solenoid 64 must be closed, as shown in FIG. 2A. The hydraulic fluid 44 pressure acts on the piston, pushing it against the air and/or spring(s) on the other side. If the force of the air and spring(s) is less than the force generated by hydraulic fluid pressure, then the piston will move allowing more oil to flow into the accumulator 60. In addition, the hydraulic fluid in the main supply line 42 will seat the valve 52, preventing hydraulic fluid flow into the clutch supply line 66.

Hydraulic fluid is stored in the accumulator 60 at a set volume and pressure while the engine 12 is off. If the force generated by air and/or spring(s) in the accumulator 60 is equal to or greater than the force generated by hydraulic fluid pressure, then the valve 50 will seat and there will be no movement of the piston, as shown in FIG. 2B. In addition, the hydraulic fluid in the main supply line 42 will seat the valve 52, preventing hydraulic fluid flow into the clutch supply line 66. While the solenoid 64 is closed, hydraulic fluid will remain in the accumulator 60 as there is no path for any hydraulic fluid to bypass the solenoid 64, excluding the minute amount of leakage that weeps past the clearances in the parts of the solenoid 64.

When the solenoid 64 is energized electrically, it opens. The decision to energize the solenoid 64 is determined based on an engine start command in order to have the clutches/brakes 34 ready for vehicle launch. Energizing the solenoid 64 allows hydraulic fluid to leave the accumulator 60, enter the solenoid 64, unseat the valve 52, and flow into the main supply line 42 that feeds the first and second clutch actuators 55 and 57, shown in FIG. 2C. Simultaneously, the hydraulic fluid leaves the accumulator 60 and enters the clutch supply line 66. Hydraulic fluid communicates through the orifice 70 and directly into the third clutch actuator 59. Additional flow may, in certain situations, communicate back through the solenoid 58 and into the main supply line 42 to feed the solenoids 54 and 56. Once pressure within the main line pressure circuit rises due to the activation of the pump 39, the solenoid 64 is closed electrically by turning off power to the solenoid 64. The accumulator 60 charge process can start over again to allow for another engine off event.

When the motor vehicle 5 stops (i.e., at a red light for example), it may be desirable to shut off the engine 12 in order to improve fuel economy. However, during an automatic engine stop event, the engine 12 is shut down which cause a loss of hydraulic fluid pressure in the transmission hydraulic circuit and clutches. In order to properly control the transmission 14 upon engine re-start and vehicle launch, transmission oil circuits must be filled and clutches pre-staged before vehicle launch by discharging the accumulator 60. For example, when an auto start signal is commanded the controller 36 energizes the solenoid 64 thereby discharging the accumulator 60. In addition, application of a brake pedal or gas pedal for a predefined period of time may also be used to initiate accumulator 60 discharge. By providing a parallel feed path from the accumulator 60 to the third clutch actuator 59 via the clutch supply line 66, the third clutch 108 may be quickly engaged thereby providing a boost to performance during launch. Alternatively, the parallel feed path may also feed clutch 98 if the transmission 14 architecture permits the additional fluid lines. Utilizing a parallel path from the accumulator 60 to the third clutch actuator 59 that circumvents additional passage restrictions such as the clutch feed orifice 104. This allows faster clutch fill times during start/stop events while maintaining the clutch feed orifice size. The parallel path also reduces effective restriction of the main supply line 42 by reducing the total volume of fluid that needs to traverse the pathway in a given time. As fluid velocity decreases due to reduced volume demands through main supply line 42 the system as a whole becomes more efficient.

The description of the invention is merely exemplary in nature and variations that do not depart from the gist of the invention are intended to be within the scope of the invention. Such variations are not to be regarded as a departure from the spirit and scope of the invention.

The following is claimed:

1. A hydraulic control system for a transmission comprising:
   a source of pressurized hydraulic fluid;
   an accumulator subsystem in downstream fluid communication with the source of pressurized hydraulic fluid, wherein the accumulator subsystem includes an accumulator in communication with a first one-way valve and an accumulator solenoid, wherein the first one-way valve and the accumulator solenoid are disposed in parallel to one another;
   a clutch solenoid having an inlet in downstream fluid communication with the accumulator subsystem and the source of pressurized hydraulic fluid;
   a clutch actuator in downstream fluid communication with the clutch solenoid and the accumulator subsystem;
   a first fluid flow path defined as fluid communication from the source of pressurized hydraulic fluid through the clutch solenoid to the clutch actuator; and
   a second fluid flow path defined as uninterruptible fluid communication from the accumulator subsystem to the clutch actuator and to the inlet of the clutch solenoid, wherein the second fluid flow path is disposed in parallel to the first fluid flow path.

2. The hydraulic control system of claim 1 further comprising a third fluid flow path from the source of pressurized hydraulic fluid through the first one-way valve to the accumulator and a fourth fluid flow path from the accumulator through the accumulator solenoid to the second fluid flow path.

3. The hydraulic control system of claim 1 further comprising a second one-way valve and a fifth fluid flow path from the second fluid flow path through the second one-way valve to the first fluid flow path.

4. The hydraulic control system of claim 1 further comprising a second clutch solenoid, a second clutch actuator, and a sixth fluid flow path from the first fluid flow path, through the second clutch solenoid, to the second clutch actuator.

5. The hydraulic control system of claim 1 wherein the clutch actuator is configured to engage a first gear ratio in the transmission.

6. The hydraulic control system of claim 1 wherein the clutch solenoid is a variable flow solenoid.

7. The hydraulic control system of claim 1 wherein the source of pressurized hydraulic fluid includes an engine driven pump.

8. The hydraulic control system of claim 7 wherein the accumulator subsystem provides pressurized hydraulic fluid through the second fluid flow path when the engine driven pump is not being driven by the engine.

9. A hydraulic control system for a transmission comprising:
   a source of pressurized hydraulic fluid;
   a first one-way valve in fluid communication with the source of pressurized hydraulic fluid
   an accumulator in fluid communication with the first one-way valve;
   an accumulator solenoid in fluid communication with the accumulator;
   a second one-way valve in fluid communication with the accumulator solenoid and the source of pressurized hydraulic fluid;
   a clutch solenoid in downstream fluid communication with the first one-way valve, the second one-way valve, and the source of pressurized hydraulic fluid; and
   a clutch actuator in uninterruptible downstream fluid communication with both the clutch solenoid and the accumulator solenoid.

10. The hydraulic control system of claim 9 wherein the first one-way valve and the accumulator solenoid are disposed in parallel to one another.

11. The hydraulic control system of claim 10 wherein the first one-way valve allows fluid communication in one direction only from the source of pressurized hydraulic fluid to the accumulator and the second one-way valve allows fluid communication in one direction only from the accumulator solenoid to the clutch solenoid.

12. The hydraulic control system of claim 9 further comprising a second clutch solenoid in fluid communication with the source of pressurized hydraulic fluid, the first one-way valve, and the second one-way valve and further comprising a second clutch actuator in fluid communication with the second clutch solenoid.

13. The hydraulic control system of claim 9 wherein the clutch actuator is configured to engage a first gear ratio in the transmission.

14. The hydraulic control system of claim 9 wherein the clutch solenoid is a variable flow solenoid.

15. The hydraulic control system of claim 9 wherein the source of pressurized hydraulic fluid includes an engine driven pump.

16. A hydraulic control system for a transmission comprising:
   a source of pressurized hydraulic fluid;
   an accumulator subsystem;
   a clutch solenoid;
   a clutch actuator;
   a one-way valve;
   a first fluid flow path defined as fluid communication from the source of pressurized hydraulic fluid through the clutch solenoid to the clutch actuator;
   a second fluid flow path defined as uninterruptible fluid communication from the accumulator subsystem to the clutch actuator;

a third fluid flow path defined as fluid communication from the second fluid flow path through the one-way valve to the first fluid flow path; and a fourth fluid flow path defined as fluid communication from the source of pressurized hydraulic fluid to the accumulator subsystem.

17. The hydraulic control system of claim 16 further comprising a second clutch solenoid, a second clutch actuator, and a fifth fluid flow path from the first fluid flow path, through the second clutch solenoid, to the second clutch actuator.

* * * * *